United States Patent [19]
Ye et al.

[11] Patent Number: 5,721,649
[45] Date of Patent: Feb. 24, 1998

[54] FLOATING TYPE MAGNETIC HEAD SLIDER HAVING AIR INFLOW SIDE TRIANGULAR PROTRUSIONS

[75] Inventors: Xinhua Ye; Aiji Matsumoto, both of Hamamatsu; Takashi Furuoya, Kawasaki, all of Japan

[73] Assignee: Minebea Co., Ltd., Nagano, Japan

[21] Appl. No.: 657,563

[22] Filed: Jun. 4, 1996

[30] Foreign Application Priority Data

Jun. 6, 1995 [JP] Japan .................................. 7-139694

[51] Int. Cl.$^6$ .............................. G11B 5/60; G11B 21/21
[52] U.S. Cl. ........................................................ 360/103
[58] Field of Search ................................... 360/103–106

[56] References Cited

U.S. PATENT DOCUMENTS

| | | | |
|---|---|---|---|
| 5,513,056 | 4/1996 | Kawasaki et al. | 360/103 |
| 5,526,204 | 6/1996 | French et al. | 360/97.02 |
| 5,537,273 | 7/1996 | Hendriks et al. | 360/103 |
| 5,550,693 | 8/1996 | Hendriks et al. | 360/103 |
| 5,610,784 | 3/1997 | Dorius et al. | 360/103 |

FOREIGN PATENT DOCUMENTS

| | | | |
|---|---|---|---|
| 52-56917 | 5/1977 | Japan | 360/103 |
| 1-46275 | 2/1989 | Japan | 360/103 |
| 3-241577 | 10/1991 | Japan | 360/103 |

*Primary Examiner*—Jefferson Evans
*Attorney, Agent, or Firm*—Staas & Halsey

[57] ABSTRACT

A floating type magnetic head slider, having a protrusion part for generating a floating force by a fluid bearing action on a magnetic recording medium, having a surface of the floating type magnetic head slider opposed to the magnetic disk, two flat grooves intersecting each other on the surface of the floating type magnetic head slider, slider fluid lubricating surfaces separated by the two flat grooves, generating a floating force by a fluid bearing action, two protrusions separated by a central groove along a center line of the surface, and a writing/reading magnetic head core connected to the rear end or the side of the slider fluid lubricating surface.

4 Claims, 9 Drawing Sheets

A: A SLIDER ACCORDING TO THE EMBODIMENT OF THE INVENTION

B: A SLIDER OF THE TRIPAD

FLOATING TYPE MAGNETIC HEAD SLIDER HAVING AIR INFLOW SIDE TRIANGULAR PROTRUSIONS

BACKGROUND OF THE INVENTION 1. (Field of the Invention)

This invention relates to a floating type magnetic head used for a magnetic recorder.

2. (Description of the Prior Art)

To hold a gap between a magnetic recording medium (hereinafter referred to as "a magnetic disk") and a magnetic writing/reading head (hereinafter referred to as a "magnetic head") in a magnetic recorder, a floating type magnetic head is used having a slider for holding the magnetic head which approaches the rotating magnetic disk and slightly floats on the magnetic disk surface by the flow of the air generated as the magnetic disk is rotated.

To access a track recorded on the magnetic disk at present, a swing arm type actuator is used. In this actuator, the slider is held at the end of a strut supported at one point, and the slider is so moved at a fulcrum as a center as to tilt from the inner periphery to the outer periphery of the magnetic disk or vice versa to be disposed at the predetermined track on the magnetic disk.

Such a floating type magnetic head has a variation of a gap (floating height) between the magnetic disk and the magnetic head due to the difference of the speeds at the inner and outer peripheries of the magnetic disk, and a variation of the floating height as an air inflow angle (hereinafter called as a "skew") to the slider for placing the magnetic head at the inner and outer peripheries of the magnetic disk, and the floating heights are different according to the position of the track.

The floating height of the magnetic disk largely influences the electromagnetic conversion efficiency of a magnetic element. The smaller the floating height is, the higher the recording density becomes. According to technological trend expectation, the floating height becomes about 50 to 30 nm in 1997. A low floating slider of a constant floating height for always holding a constant floating height at any position of a magnetic disk is desired.

On the other hand, when the magnetic disk is stopped steadily, the magnetic head is contacted with the magnetic disk. When the magnetic disk starts to rotate, the air starts to inflow between the magnetic disk and the magnetic head, and the magnetic head is floated. Therefore, at the time of starting, the magnetic disk is held in a sliding state with the magnetic head for a certain time, and thereafter the magnetic head is floated above the magnetic disk. To enhance the reliability and the durability, the sliding state is preferably as short as possible. Further, when the magnetic head is temporarily deviated from the stable state due to external disturbance, it is desired that the magnetic head is rapidly reset to the stable state without contact with the magnetic disk.

In the magnetic disk apparatus using the present floating type magnetic head as described above, it is desired that the floating height of the magnetic head is always constant and low at the inner and outer peripheries of the magnetic disk, the magnetic head is floated as fast as possible at the time of starting, and high stiffness coefficient and high damping coefficient are provided.

The floating characteristics of such a magnetic head largely depend upon the shape of the surface (hereinafter referred to as a "fluid lubricating surface") of the slider opposed to the magnetic disk. Therefore, the slider having various fluid lubricating surfaces has been developed at present. The shape of the surface of the slider becomes more complicated year after year. Accordingly, the processing becomes impossible when using conventional mere cutting technology. Precision processing techniques such as ion milling using optical exposure technology, chemical etching is being introduced. However, these technologies increase processing steps, and the yield of products decreases. Further, product costs are increased due to these technologies.

FIGS. 7 and 8 show a tripad slider proposed by Read Write Co., recently. In FIGS. 7 and 8, rails 3 and 4 extended longitudinally are formed at the right and left sides of the air inflow side of an upper surface of a slider 1', i.e., a fluid lubricating surface, and a protrusion 5 isolated at the air discharge side is provided in the same height as the rails 3 and 4 at the rear end face 2 of the slider. Writing/reading heads 6 are mounted at the center of the rear end face 2 of the slider 1'.

As shown in FIG. 8, the rails 3, 4 and the protrusion 5, i.e., the fluid lubricating surface is opposed to a magnetic disk 15. A flow is generated at the air by the rotation of the magnetic disk 15, and the slider is slightly floated over the magnetic disk 15 surface by the fluid bearing action of the air.

The features of the floating type magnetic head are that:
(1) the processing of the fluid lubricating surface has the possibility of the conventional cutting, (2) the slider is stably floated, (3) the slider is floated in the state of pseudo-contact, (4) the time from the stop to the floating is short, and (5) the protrusion of the air discharge end provides the mounting place of a magnetic element to generate a slight fluid pressure.

Particularly, the magnetic head effective in the low floating height is considered.

However, in this slider, the rails 3 and 4 are rectangular, and ended in the vicinity of the center of the slider. Further, there is the protrusion 5 of the same height at the rear of the slider of the central groove between the rails 3 and 4. This structure makes the machining of the slider surface very difficult.

That is, to allow the protrusion 5 to remain, the grinding of the center must stop on the way. The smaller the size of the slider becomes, the more the processing becomes difficult.

The floating characteristics of the slider are shown in FIG. 9. FIG. 9 shows the results of the simulations of the floating height (the distance between the magnetic disk surface and the magnetic head end) of the slider along the radial direction of the magnetic disk and the pitching (the inclination of the slider longitudinal direction in the case of the air inflow of the slider) by altering the areas of the fluid lubricating surface (corresponding to curves A, B and C of FIG. 9).

When the curve B is observed as one example of the floating characteristics in FIG. 9(a), the floating height is 25 nm at the inner periphery of the magnetic disk and 42 nm at the outer periphery. Thus, the floating height of the slider of this case is varied by +72%. As understood from FIG. 9(b), the pitching is also increased as the radius is increased. The variation of the pitching of the curve B is increased by 50% at the outer periphery of the magnetic disk.

The protrusion 5 of the slider has the surface substantially perpendicular to the inflow direction of the air. The perpendicular surface of the protrusion 5 of the slider easily causes problem of a head crush due to the adherence and the storage of dusts in the air.

The side of the slider is further decreased in size from 1.6×2.0 mm at present, and hence the machining of the slider becomes further difficult as described above. To form the shape shown in FIG. 7, a processing method such as dry etching, might sometimes be employed. Thus, a producing process is complicated.

This invention contemplates to eliminate the difficulties of the prior art as described above. An object of this invention is to provide a floating type magnetic head having a slider in which the conventional grinding technique can be applied to the processing of the fluid lubricating surface of the slider as it is, and the slider can be floated with stable and has a constant floating height.

SUMMARY OF THE INVENTION

To achieve the object of this invention as described above, this invention provides a floating type magnetic head having a protrusion part for generating a floating force by a fluid bearing action on a magnetic disk, and a writing/reading magnetic head core, comprising a groove formed of three intersecting cut stripes on a flat surface opposed to the magnetic disk, four slider fluid lubricating parts formed in island states by the formed groove with the surface as the slider fluid lubricating surfaces. Further, in more details, the two of said four protrusions of the fluid lubricating action surfaces are disposed at an air inflow side and the other two is disposed at an air discharge side. Moreover, the one of said three intersecting cut stripes is a groove formed on a centerline from the air inflow end to the air discharge end. In addition, said writing/reading magnetic head core is connected to the sides or the rear ends of the two protrusions disposed at the air discharge side of said protrusion part.

Two small slider lubricating parts are provided via the grove near the center at the air inflow side at the four slider lubricating parts, two large slider lubricating parts are disposed at the outside of both side ends of the air discharge side, and the writing/reading head is connected to the slider side rear end or the slider rear side end. The depths of the cut stripes on the flat plate are desirably 1 μm or more from the fluid lubricating surface. With such a structure, the slider lubricating part is formed indispensably in a wedge shape to the flow of the fluid. Therefore, the adherence and the storage of dusts is very little.

Further, the groove can be processed by cutting, and the floating type magnetic head of high performances such as wide degrees of freedoms of designing the shape of the slider lubricating part, excellent flowing height characteristics of the inner and outer peripheries of the slider, high stiffness coefficient and high damping coefficient is provided.

DESCRIPTION OF THE PREFERRED EMBODIMENTS

To understand the scope of this invention better, an embodiment of this invention will be described in detail with reference to the accompanying drawings.

Figure 1A:
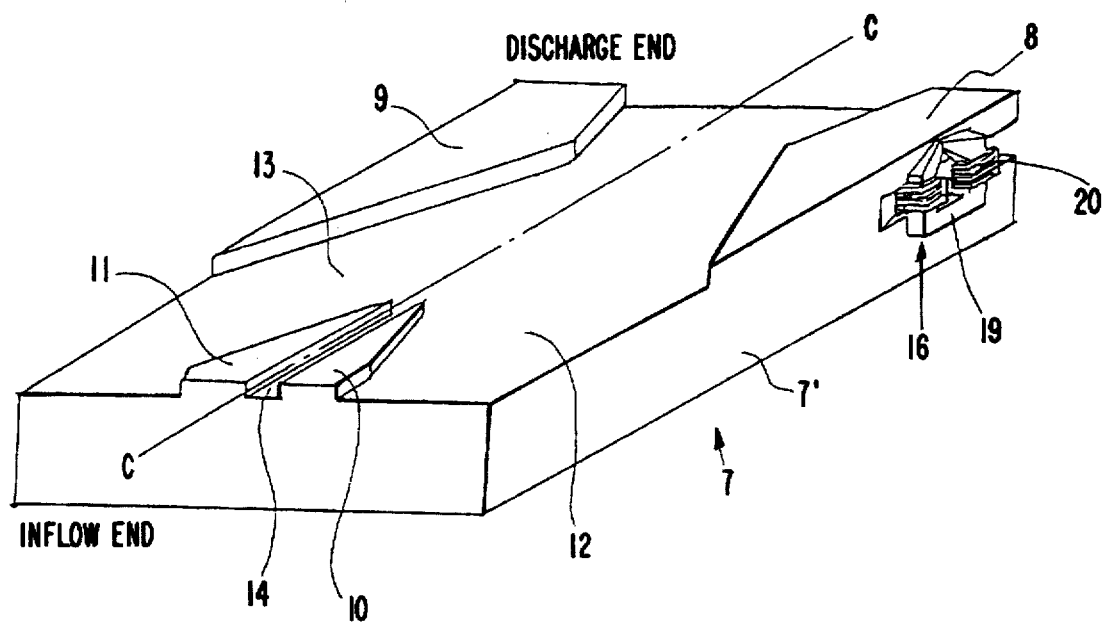
FIGS. 1(a) and 1(b) are views of a slider of an embodiment of this invention.

FIGS. 1(a) and (b) are perspective views showing the contact surface of a floating type magnetic head with a magnetic disk according to this invention. In FIG. 1(a), slider fluid lubricating surfaces 8 and 9 are formed at both sides of a slider 7. Flat grooves 12 and 13 are so formed between the slider fluid lubricating surfaces 8 and 9 as to intersect in an X shape. A triangular island-shaped protrusion formed by intersecting the grooves 12 and 13 is split to protrusions 10 and 11 by a groove 14 along a center line. The slider fluid lubricating parts 8 and 9 and the protrusions 10 and 11 form a slider lubricating surface. The protrusions 10, 11 are disposed at fluid inflow end. The structure of a writing/reading head 16 is the same as that of the conventional writing/reading head, and provided at the rear end face FIG. 1(b) or the side rear end 7' of the fluid lubricating part 8 or 9 (FIG. 1(a).

Figure 1B:
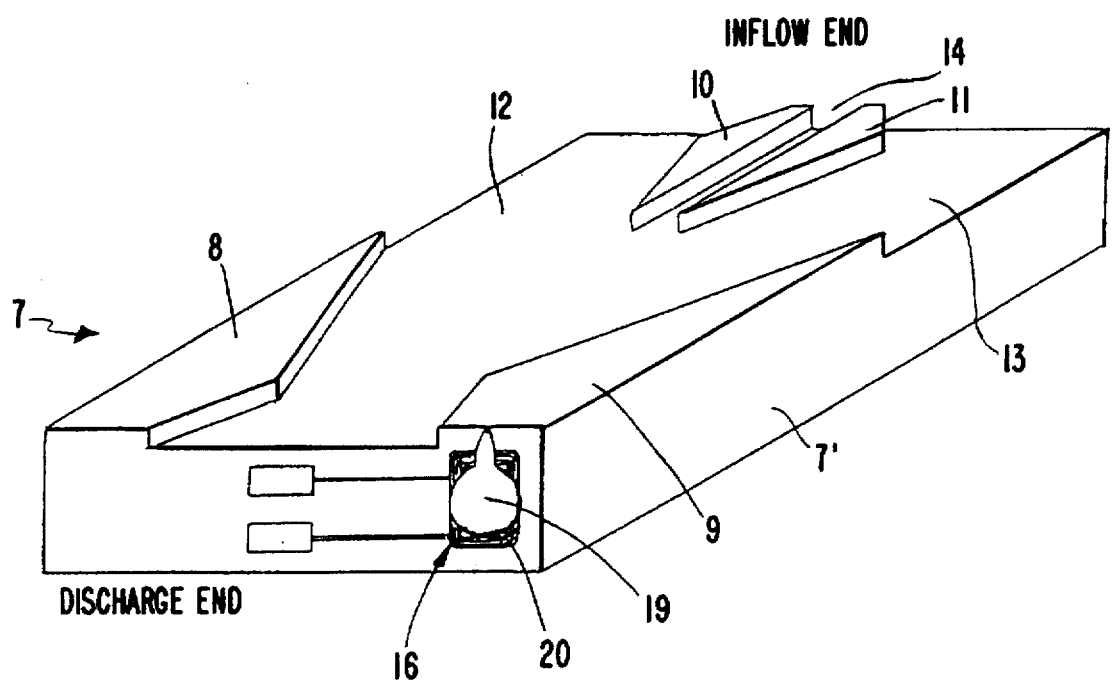
Figure 2:
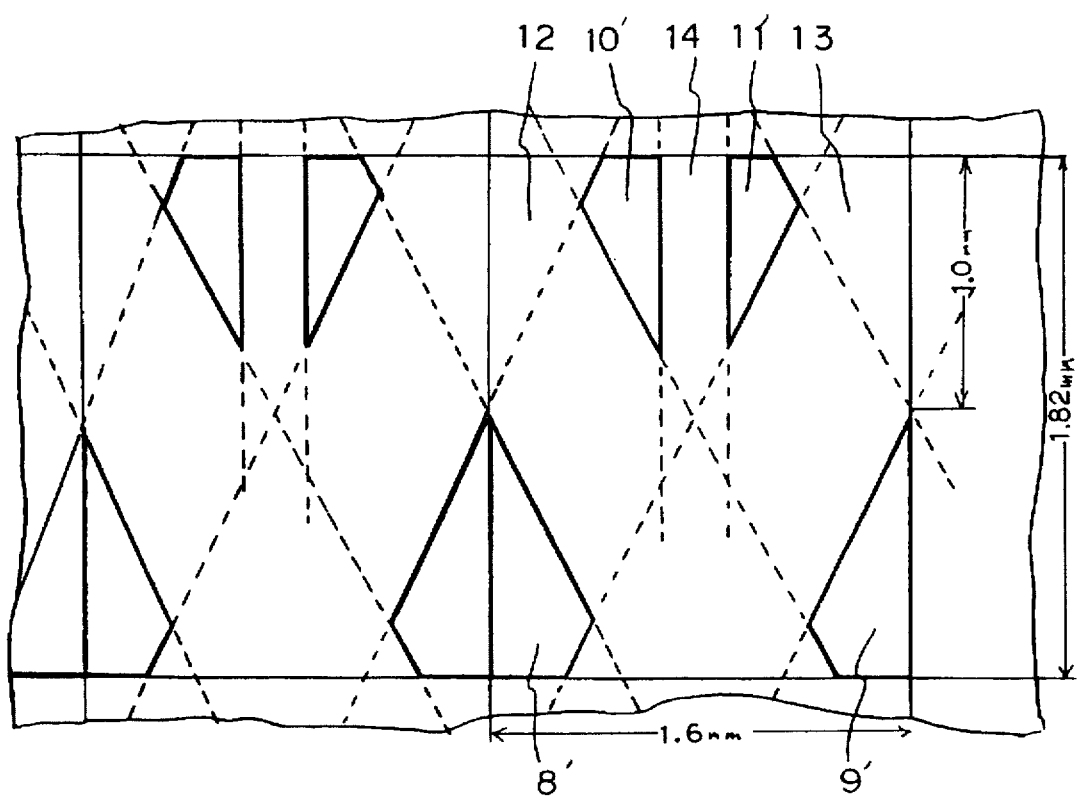
FIG. 2 is a plan view of the slider of the embodiment of this invention.
Figure 3:
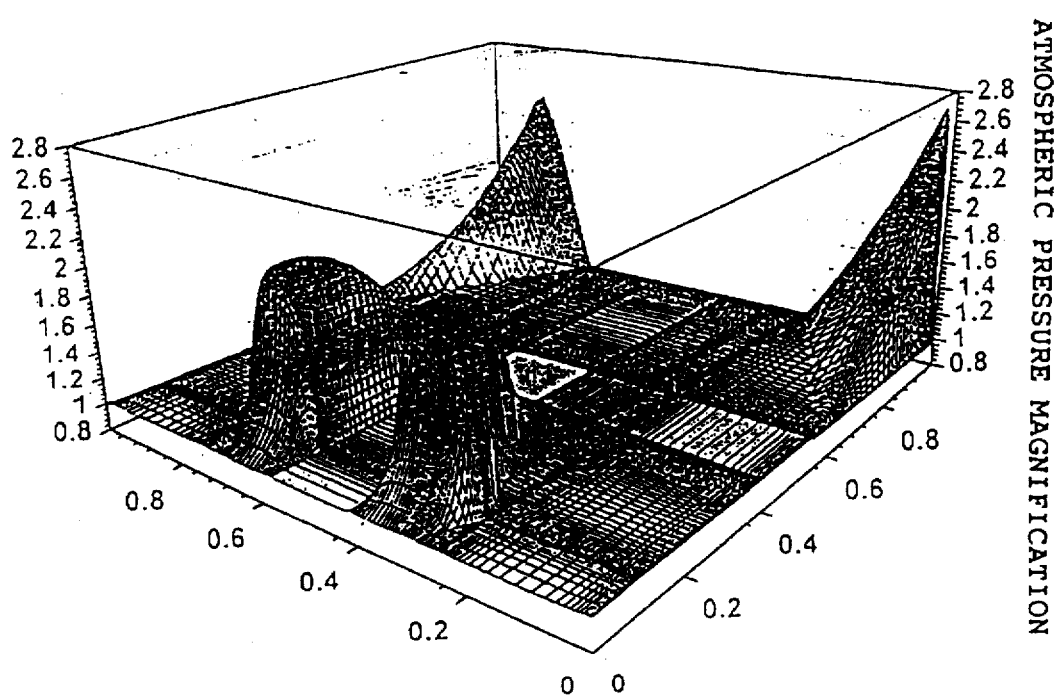
FIG. 3 is a pressure distribution diagram of the slider of the embodiment of this invention.

As described above, the magnetic head of this invention can be formed, as shown in FIG. 2, by aligning a plurality of sliders, simultaneously processing of only the two intersecting grooves 12 and 13 and the central groove 14, i.e., the three cut stripes. FIGS. 1(a) and 1(b) are a plan view showing the contact surface of the floating type magnetic head with the magnetic disk. As shown in FIG. 2, slider fluid lubricating parts 8' and 9', and protrusions 10' and 11' are substantially triangular or shapes in which the part of the triangular shape is cut out as a reference. The shapes and the areas of the fluid lubricating surfaces are altered by selecting the widths of the grooves 12, 13, 14 and the angle of the grooves 12, 13 to the center line C. FIG. 3 shows the result of the calculation of the pressure distribution of the slider lubricating surface of this embodiment.

In the embodiment of this invention described above, the slider having the longitudinal and lateral sizes of 1.82×1.6 mm is formed of the angle to the center line C of 26°, the intersecting groove width of 730 μm the central grove width of 250 μm, and the groove depth of 40 μm, and the writing/reading head is mounted at the side face of the discharge end of the fluid lubricating part 8.

Figure 4A:
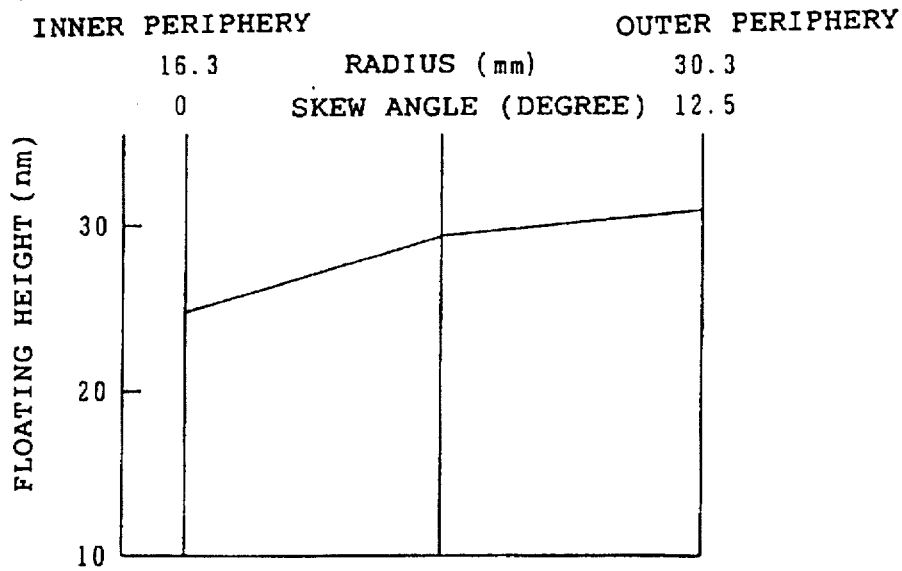
FIGS. 4(a), 4(b) and 4(c) are floating characteristic diagrams of the slider of the embodiment of this invention.

FIGS. 4 show the floating characteristics of the embodiment of this invention. FIG. 4(a) shows the flowing height at the writing/reading head position. The floating height is about 25.5 nm at the inner peripheral position (radius=16.3 mm, skew=0°) and about 31.5 nm at the outer peripheral position (radius 30.3 mm, skew=12.5°) at the rotating speed of 4,000 rpm, the rate of change is about 23.5% (the ratio of the floating heights at the inner periphery to the outer periphery is 1.235). This is considerably improved as compared with 72% of the rate of change of the floating height of the peripheral speed of the tripad of the prior art as already described.

Figure 4B:
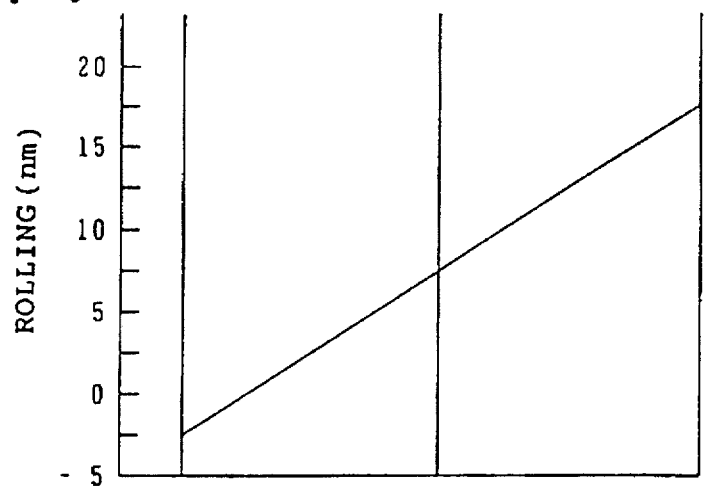

FIG. 4(b) shows the radius dependence of the rolling of this embodiment.

Figure 4C:
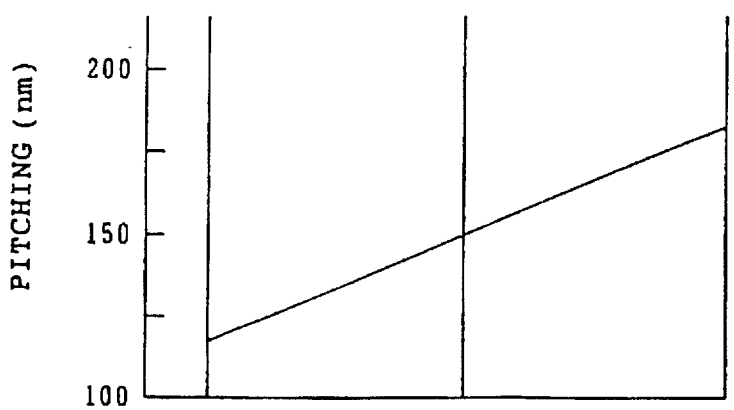

FIG. 4(c) shows the radius dependence of the pitching of this embodiment. In this case, the inner periphery is 122 nm, and the outermost periphery is 180 nm. The absolute values are not only small, but also the variations are small, which shows that the slider is floated with stable.

FIGS. 5 are views showing the floating characteristics lot the embodiment of this invention.

Figure 5A:
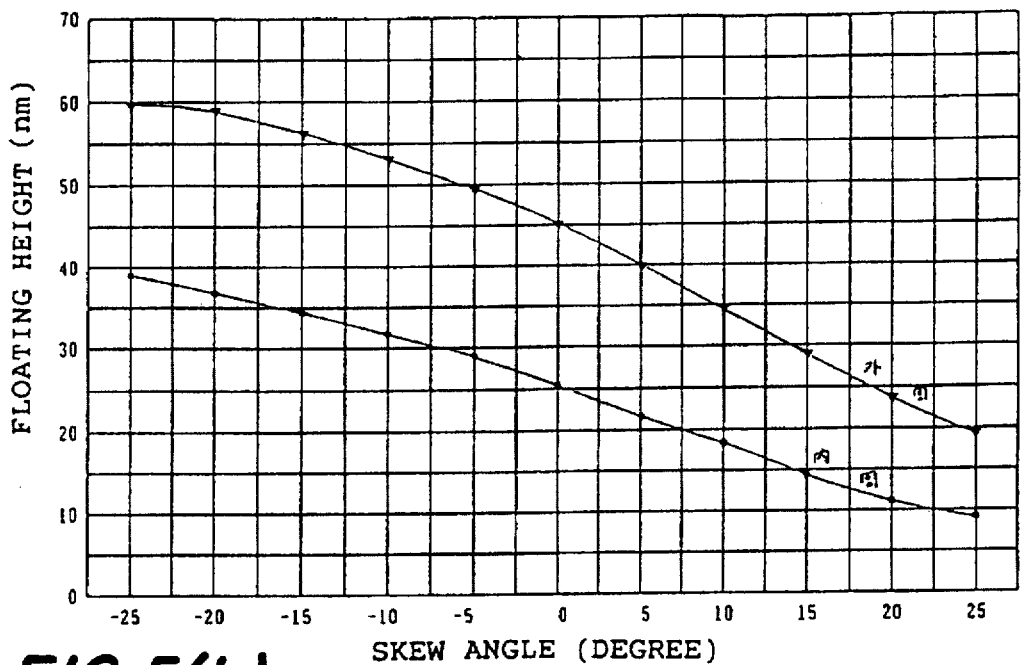
FIGS. 5(a) and 5(b) are characteristic diagrams of the embodiment of this invention in which the relationship between the floating height of the slider and the skew dependence and the transient response characteristics are compared with those of the prior art.
Figure 5B:
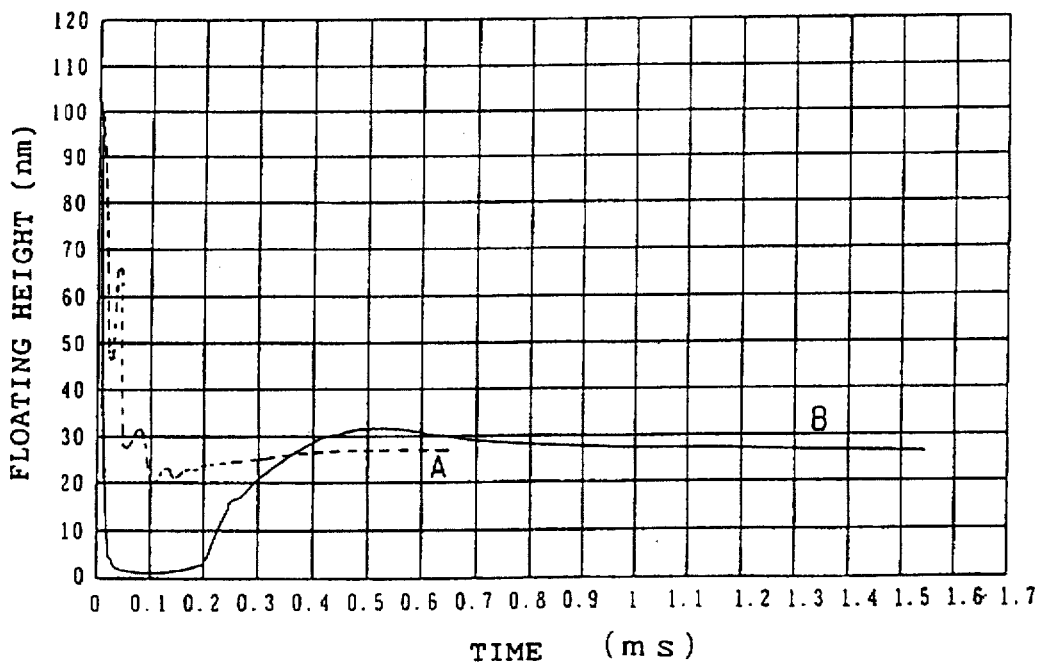

FIG. 5(a) shows the skew dependence of the floating characteristics. Until the skew is varied from minus to plus, the variation of the flowing height is not a normal parabola, but a linear relationship. The available range of the skew is increased. That is, the skew angle of the inner periphery of the slider can be selected at the minus side. Of course, it means that the skew angle of the inner periphery of the slider can be selected also at the plus side. FIG. 5(b) shows the transient response characteristics of the slider according to this invention and the tripad slider of the prior art. That is, how the floating height of the magnetic head is arrived at the stable state when the magnetic head is moved from a certain constant attitude is examined in terms of a time history.

As apparent from FIGS. 5, in the case of the tripad (curve B), the slider is once contacted with the magnetic disk surface for a considerable time, and then floated. The time reaching the predetermined stable state is very long of 1.5 msec. or more. On the other hand, in the slider of the embodiment of this invention (curve A), the slider is not contacted with the magnetic disk, reached the stable floating height, and the time reaching the stable state is half or less of the tripad slider of 0.7 msec. or less. That is, the floating stability is much excellent as compared with that of the prior art.

TABLE 1

Change of floating height by gram load

| | Inner periphery | | | Outer periphery | | |
|---|---|---|---|---|---|---|
| g-load | TPC | Trypad | Embodiment | TPC | Trypad | Embodiment |
| 3.0gf | 100% | 100% | 100% | 100% | 100% | 100% |
| 4.0gf | 58,8% | 58.5% | 65% | 63.6% | 64.9% | 69.2% |

The Table 1 shows the influence of the gram load to the floating height. As understood from the Table 1, when the gram load is increased from 3.0 gf to 4.0 gf, the reduction of the floating height of the slider of this embodiment is smallest irrespective of the inner and outer peripheries as compared with the TPC and the tripad slider. The slider of this invention exhibits the height rigidity coefficient.

Figure 6:
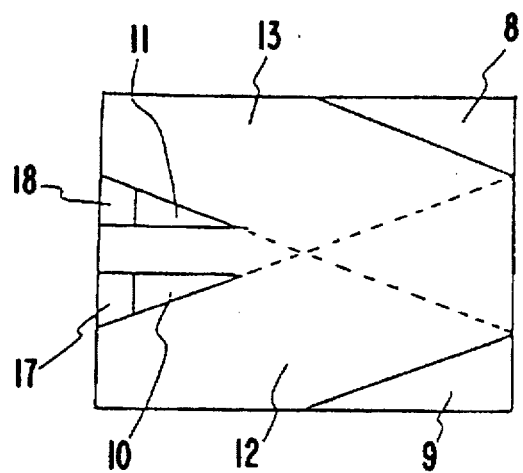
FIG. 6 is a plan view showing a second embodiment of this invention.
Figure 7:
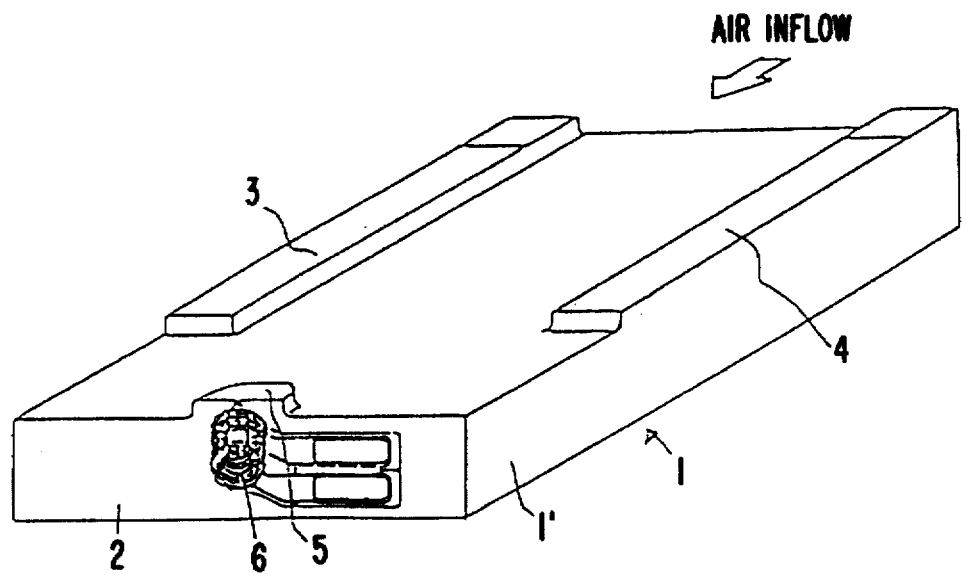
FIG. 7 is a perspective view of a conventional tripad slider.
Figure 8:
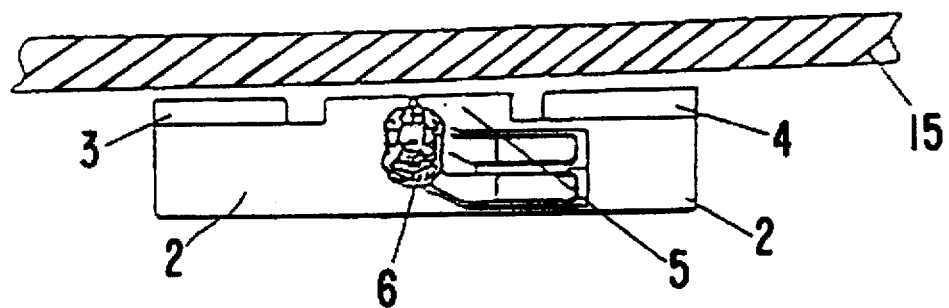
FIG. 8 is a front view showing the position of relationship between the conventional tripad slider and a magnetic disk.
Figure 9A:
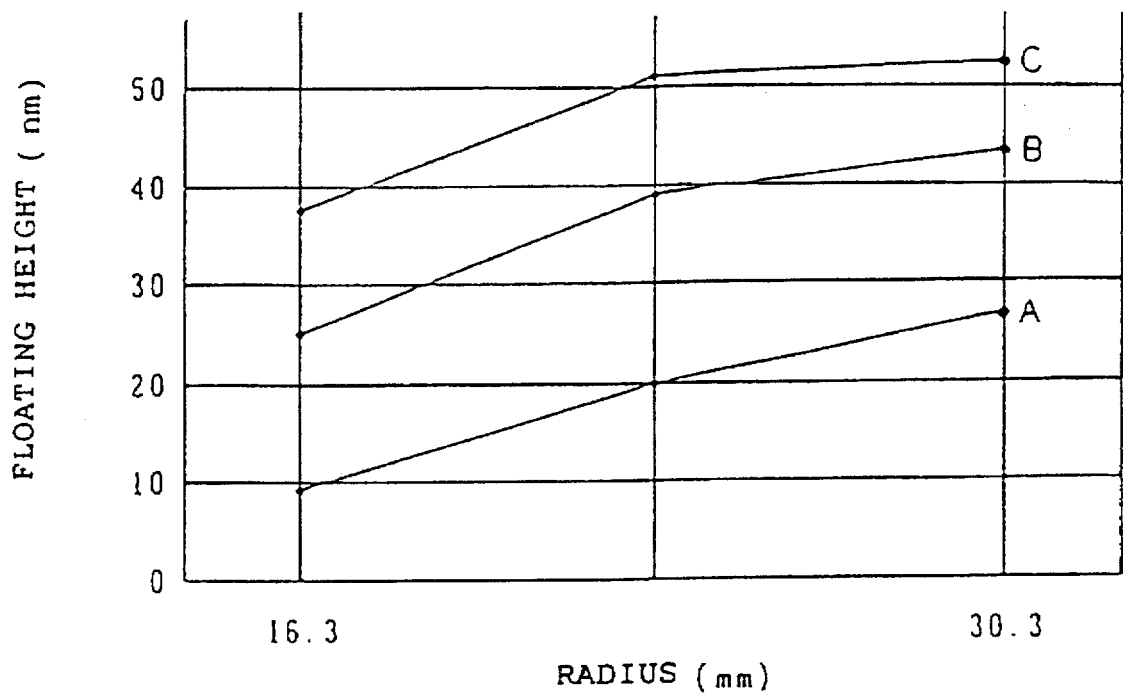
FIGS. 9(a) and 9(b) are characteristic diagrams of the conventional tripad slider.
Figure 9B:
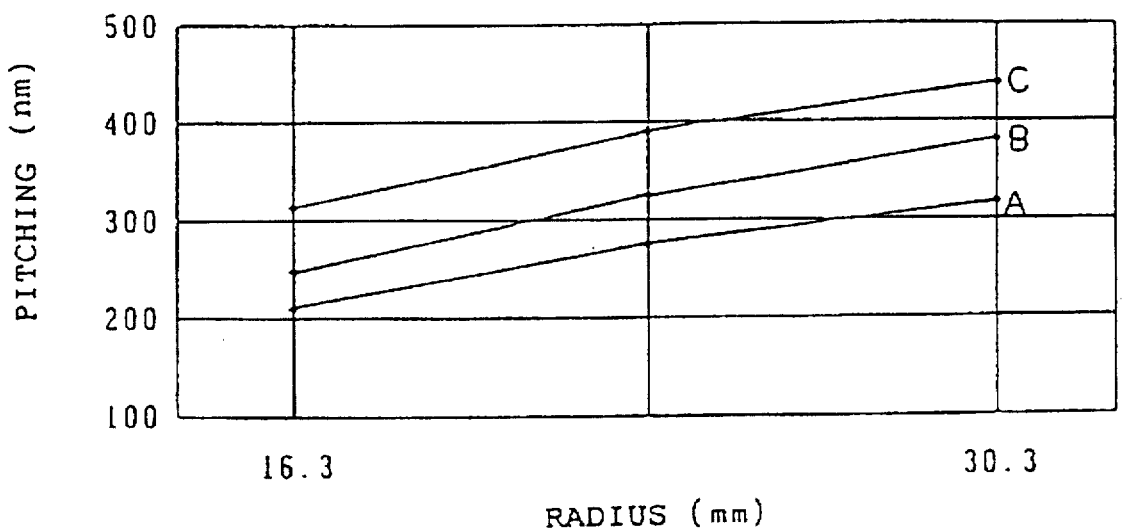

This invention has been described according to the embodiment described above. However, as shown, for example, in FIG. 6, various modifications may be provided according to the intersecting of the grooves 12, 13 and 14 by forming the shapes of the protrusions 10, 11 triangular, cutting out the inflow end sides 17 and 18, and forming the slider lubricating surfaces 8 and 9 triangular. These modifications and applications are not excluded from the scope of this invention.

Further, this invention has been described by the embodiment in which the fluid lubricating surfaces are symmetrically disposed to the fluid inflow direction.

However, even if the fluid lubricating surfaces are asymmetrically disposed, this is not excluded from the scope of this invention.

According to this invention, the processing of the slider may be the cut groove of the surface of the slider opposed to the magnetic disk, the mere two intersecting cut stripes and the central cut stripe, and many sliders may be aligned and simultaneously processed. Further, the process may be facilitated only by the conventional mechanical technique. Accordingly, the processing cost can be reduced.

The shape of the fluid lubricating surface of the fluid discharge end is formed indispensable in the wedge shape to the flow of the fluid according to this method. Therefore, the floating type magnetic head in which the adherence and the storage of the dusts is very small can be provided.

According to this invention, the floating type magnetic head in which the wide degrees of the freedoms of designing the shape of the slider lubricating part are provided, high performances such as excellent floating height characteristics of the inner and outer peripheries of the slider and high stiffness coefficient and high damping coefficients are provided can be provided.

We claim:

1. A floating type magnetic head slider having a protrusion part for generating a floating force by a fluid bearing action on a magnetic recording medium, comprising:

a surface of the floating type magnetic head slider opposed to a magnetic disk;

said floating type magnetic head slider having corners and having an air inflow side and an air discharge side at opposite ends;

a pair of slider fluid lubricating surfaces, each having a triangular shape, formed on said corners of said floating type magnetic head slider at said air discharge side;

a pair of protrusions, each having a triangular shape, formed on the center portion of said floating type magnetic head slider at said air inflow side, wherein said pair of protrusions are adjacent to each other between which a central groove lies along a fluid flowing direction;

two flat grooves intersecting each other on the surface of said floating type magnetic head slider;

said pair of slider fluid lubricating surfaces separated by said two flat grooves generating a floating force by a fluid bearing action;

said pair of protrusions separated by said central groove along a center line of said surface of said slider fluid lubricating surface; and a writing/reading magnetic head core connected to a rear end or a side of one of said slider fluid lubricating surface.

2. A floating type magnetic head slider according to claim 1, further comprising:

said pair of slider fluid lubricating surfaces and said pair of protrusions are disposed symmetrically on said floating type magnetic head slider as to said fluid flowing direction; and said pair of protrusions are disposed symmetrically on said floating type magnetic head slider as to said fluid flowing direction.

3. A floating type magnetic head slider according to claim 1, further comprising:

said magnetic head core is connected to sides, at any position, of said slider fluid lubricating surfaces and said fluid discharge side.

4. A floating type magnetic head according to claim 1, wherein said writing/reading magnetic head core is connected to a side or a rear end of one of said pair of protrusions disposed at the air discharge side of said protrusion part.

* * * * *